(12) United States Patent
Jang et al.

(10) Patent No.: US 8,057,216 B2
(45) Date of Patent: Nov. 15, 2011

(54) EJECTOR FOR INJECTION MOLDING MACHINE AND MOVING PLATE INCLUDING THE SAME

(75) Inventors: Byeong-Geun Jang, Osan-si (KR); Sung-Wook Jung, Jeonju-si (KR); Sung-Chul Yoo, Yongin-si (KR); Jong-Won Woo, Gunpo-si (KR)

(73) Assignee: LS Mtron Ltd., Anyang-si, Gyeonggi-do (KR)

( * ) Notice: Subject to any disclaimer, the term of this patent is extended or adjusted under 35 U.S.C. 154(b) by 191 days.

(21) Appl. No.: 12/543,350

(22) Filed: Aug. 18, 2009

(65) Prior Publication Data
US 2010/0055228 A1   Mar. 4, 2010

(30) Foreign Application Priority Data

Aug. 26, 2008   (KR) .................. 10-2008-0083354

(51) Int. Cl.
*B29C 45/40* (2006.01)
(52) U.S. Cl. .............. 425/441; 425/556; 425/595
(58) Field of Classification Search .............. 425/436 R, 425/556, DIG. 58, 441, 443, 595
See application file for complete search history.

(56) References Cited

U.S. PATENT DOCUMENTS

| | | | | |
|---|---|---|---|---|
| 4,954,074 A * | 9/1990 | Cohen | ................. | 425/556 |
| 5,439,371 A * | 8/1995 | Sawaya | ................. | 425/553 |
| 6,616,872 B2 * | 9/2003 | Kamiguchi et al. | ....... | 264/40.1 |
| 6,682,337 B2 * | 1/2004 | Meschia | ................. | 425/556 |
| 6,811,391 B1 * | 11/2004 | Klaus et al. | ............. | 425/556 |
| 6,824,375 B2 * | 11/2004 | Muller | ................. | 425/236 |
| 6,837,701 B2 * | 1/2005 | Becker et al. | ............. | 425/556 |
| 2002/0041911 A1 * | 4/2002 | Mine | ................. | 425/116 |
| 2002/0110616 A1 * | 8/2002 | Meschia | ................. | 425/556 |
| 2003/0096034 A1 * | 5/2003 | Becker et al. | ............. | 425/444 |
| 2004/0076703 A1 * | 4/2004 | Saulle | ................. | 425/190 |
| 2004/0212126 A1 * | 10/2004 | Tustin et al. | ............. | 264/255 |
| 2006/0172037 A1 * | 8/2006 | Sutter | ................. | 425/556 |

FOREIGN PATENT DOCUMENTS

KR   1020030077335   10/2003

* cited by examiner

*Primary Examiner* — Yogendra Gupta
*Assistant Examiner* — Emmanuel S Luk
(74) *Attorney, Agent, or Firm* — Sherr & Vaughn, PLLC

(57) ABSTRACT

Disclosed herein is an ejector for an injection molding machine used to extract a molded product formed inside a die, the ejector including: a first ejector plate which is movably installed in a moving plate for fixing the die; a second ejector plate which is separably connected to the first ejector plate; and an ejector pin which is installed in at least one of the first and second ejector plates so as to push outward the molded product.

7 Claims, 5 Drawing Sheets

EJECTOR FOR INJECTION MOLDING MACHINE AND MOVING PLATE INCLUDING THE SAME

CROSS-REFERENCE TO RELATED APPLICATION

This application claims priority to Korean Patent Application No. 10-2008-0083354, filed on Aug. 26, 2008, and all the benefits accruing therefrom under 35 U.S.C. §119, the contents of which in its entirety are herein incorporated by reference.

BACKGROUND

1. Field

This disclosure relates to an ejector for an injection molding machine, and more particularly, to an ejector for an injection molding machine which is installed in a moving plate so as to extract a molded product formed inside a die, and a moving plate including the same.

2. Description of the Related Art

An injection molding machine mainly includes an injection device and a clamping device, where the clamping device is used to carry out an operation of opening or closing a die, that is, a die opening operation and a die closing operation. When the die closing operation is completed by the clamping device, a molten material is injected into the die. At this time, the die is required to be strongly fastened so that the die is not opened by the high-pressure molten material.

Hereinafter, the structure of a known clamping device will be described with reference to the drawings.

As shown in FIG. 1, the known clamping device has a structure in which a fixed plate 110 and a moving plate 120 are disposed so as to face each other and a first die 111 and a second die 121 are respectively installed on facing surfaces of the fixed plate 110 and the moving plate 120. The fixed plate 110 and the moving plate 120 are connected to each other via a tie bar 101.

One end of the moving plate 120 is connected to a toggle link 140. In detail, as shown in FIG. 2, the upper and lower ends of the rear surface of the moving plate 120 are provided with ribs 122, and the upper end of each rib 122 is provided with a link hole 123. A link pin 141 is attached into the link hole 123, thereby connecting one end of the toggle link 140 to the link pin 141. By means of a driving force of the toggle link 140, the moving plate 120 moves forward or backward and the die fastening operation is carried out.

In addition, an extraction hole 124 is formed at the center portion of the moving plate 120, and connection holes 125 are respectively formed at four corners thereof so as to allow the tie bar 101 to be inserted thereinto. An ejector 130 is installed in the extraction hole 124 so as to extract a molded product formed inside the die.

In the known clamping device having the above-described configuration, the moving plate 120 is configured to be movable forward and backward by the toggle link 140. However, since the ribs 122 serving as portions used to be connected to the toggle link 140 are respectively provided in the upper and lower ends of the moving plate 120, a problem arises in that a clamping force transmitted from the toggle link 140 is not uniformly transmitted to the whole surface of the moving plate 120 but is concentrated on the upper and lower ends of the moving plate 120.

In order to solve the structural problem of the moving plate 120, the structure of the moving plate may be modified into various forms. However, when the structure of the moving plate is modified, a problem arises in that the ejector installed in the known moving plate is not applied to the moving plate having a different structure.

This disclosure is contrived to solve the above-described problems, and is directed to providing a separable ejector for an injection molding machine which is applicable to even a moving plate having a modified structure and is easily assembled to the moving plate.

SUMMARY

In one aspect, there is provided an ejector for an injection molding machine used to extract a molded product formed inside a die, the ejector including: a first ejector plate which is movably installed in a moving plate for fixing the die; a second ejector plate which is separably connected to the first ejector plate; and an ejector pin which is installed in at least one of the first and second ejector plates so as to push outward the molded product.

Spacers may be installed between the first and second ejector plates.

The spacers may be integrally formed with an upper surface of the first ejector plate so as to have a gap between the spacers, and the second ejector plate may be coupled to upper portions of the spacers.

The first and second ejector plates may be formed in a bar shape extending in one direction, and the first and second ejector plates may be coupled to each other so as to intersect with each other.

The first or second ejector plate may be inserted into the guide pin so as to be movable in a vertical direction.

In another aspect, there is provided a moving plate equipped with an ejector used to extract a molded product formed inside a die, the moving plate including: a base plate which has the die installed in a lower surface thereof and a pin hole formed therein; a frame which is installed above the base plate and has an opening formed at the center thereof; a first ejector plate which is located in a space formed between the base plate and the frame and is movably installed therein; a second ejector plate which is located inside the opening of the frame and is separably connected to an upper portion of the first ejector plate; and an ejector pin which is installed in at least one of the first and second ejector plates so as to pass through the pin hole.

A sectional area of the frame may gradually decrease in a direction toward the base plate.

A guide pin may be installed in the frame and the base plate in a fixed manner, and the first or second ejector plate may be inserted into the guide pin.

Since the ejector disclosed herein is separated into at least two or more parts, the ejector is applicable to even a moving plate having a modified structure. Particularly, the ejector is easily assembled to a center-press-type moving plate capable of transmitting a clamping force to a central surface of a die, thereby concentrating a clamping force, transmitted from a toggle link, on the center of the moving plate.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
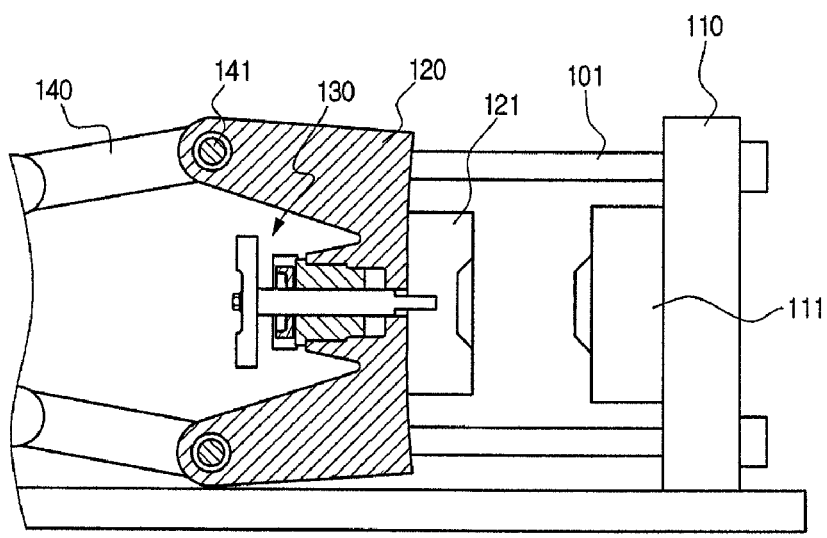
FIG. 1 is a side sectional view showing a known clamping device.
Figure 2:
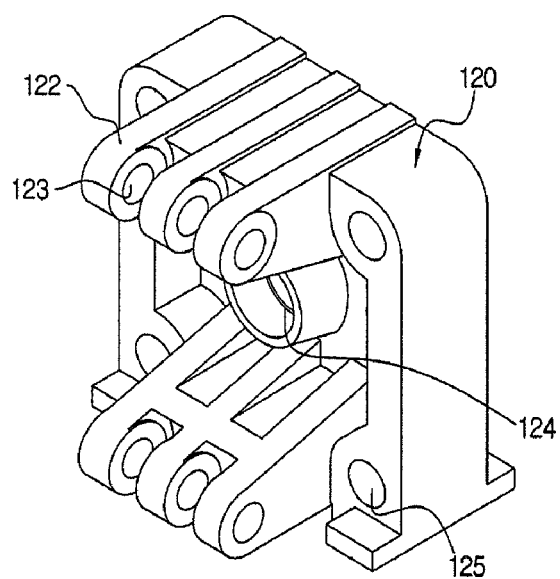
FIG. 2 is a perspective view showing a known moving plate.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, a moving plate equipped with an ejector according to an embodiment will be described in detail with reference to the accompanying drawings.

Figure 3:
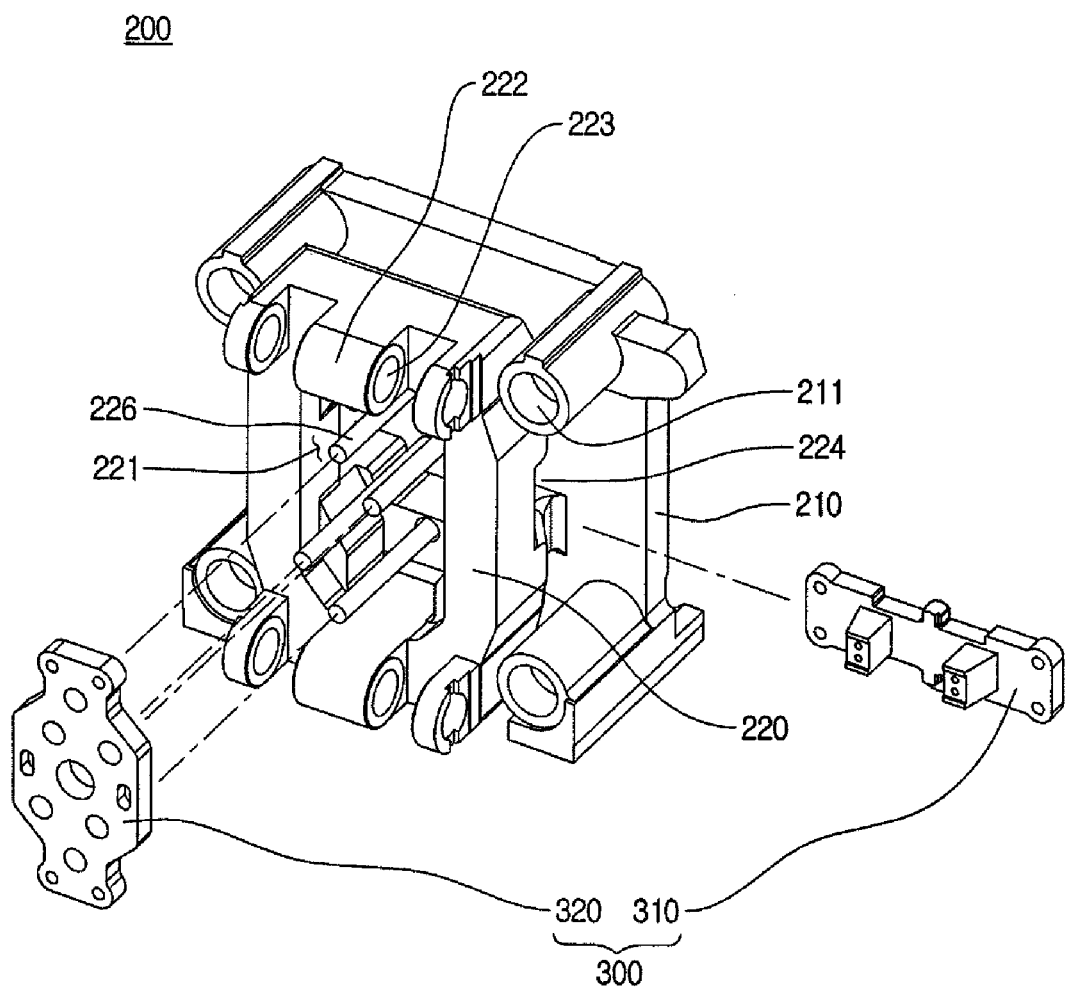
FIG. 3 is a perspective view showing a moving plate equipped with an ejector according to an embodiment.
Figure 4:
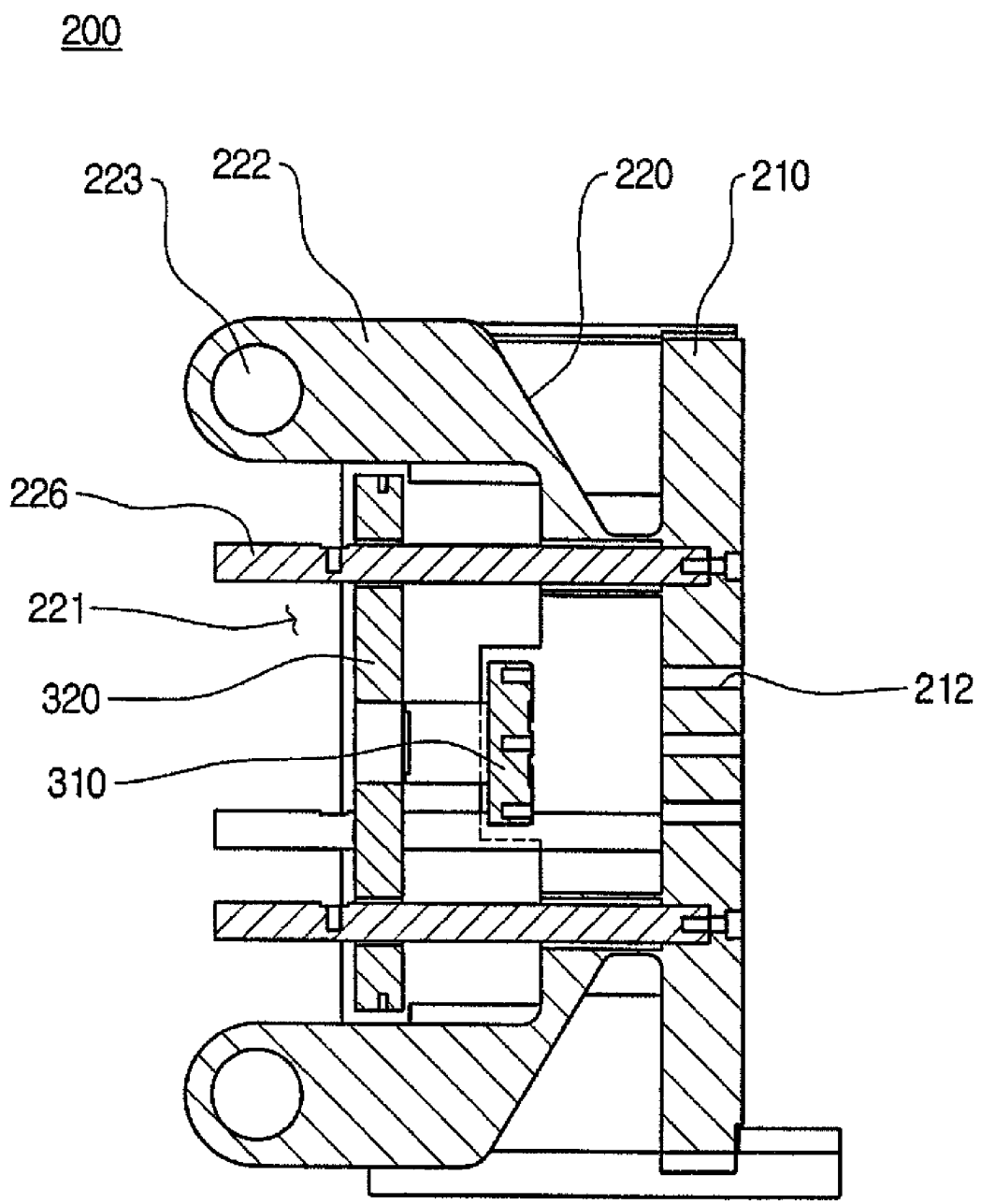
FIG. 4 is a sectional view showing the combined moving plate equipped with the ejector according to the embodiment.

FIG. 3 is a perspective view showing the detached moving plate equipped with the ejector according to an embodiment. FIG. 4 is a sectional view showing the combined moving plate equipped with the ejector according to the embodiment. For the convenience of description, an ejector pin is not shown in FIGS. 3 and 4.

As shown in FIGS. 3 and 4, a moving plate 200 according to the embodiment includes a base plate 210 which has a die installed therebelow, a frame 220 which is formed above the base plate 210, and an ejector 300 which extracts a molded product formed inside the die.

Connection holes 211 are respectively formed at four corners of the base plate 210 so as to allow a tie bar (101 shown in FIG. 1) to pass therethrough, and a plurality of pin holes 212 are formed at the center of the base plate 210. The frame 220 is installed above the base plate 210 which has an opening 221 formed at the center thereof. Ribs 222 are respectively formed in the upper and lower portions of the frame 220 in a protruding manner so as to have a gap therebetween, the rib 222 being used for the connection operation to a toggle link (140 shown in FIG. 1). Each of the ribs 222 is provided with a link hole 223. The toggle link 140 and the rib 222 are connected to each other by a connection pin.

Side-face openings 224 are respectively formed on both side lower surfaces of the frame 220. Accordingly, a space is defined between both side lower surfaces of the frame 220 and the upper surface of the base plate 210. In addition, a sectional area of the frame 220 gradually decreases in a direction from the rib 222 to the base plate 210. Accordingly, a clamping force transmitted from the toggle link is concentrated on the center of the moving plate 200.

A plurality of guide pins 226 are installed in the base plate 210 and the frame 220 in a fixed manner so as to have a gap therebetween.

The ejector 300 includes a first ejector plate 310 and a second ejector plate 320 which are separable from each other. The first ejector plate 310 is disposed between the base plate 210 and the frame 220 via the side-face openings 224 of the frame 220. The second ejector plate 320 is inserted in the guide pins 226 so as to move to the inside of the opening 221 of the frame 220. In addition, the second ejector plate 320 is coupled to the first ejector plate 310 while being disposed thereabove.

Figure 5:
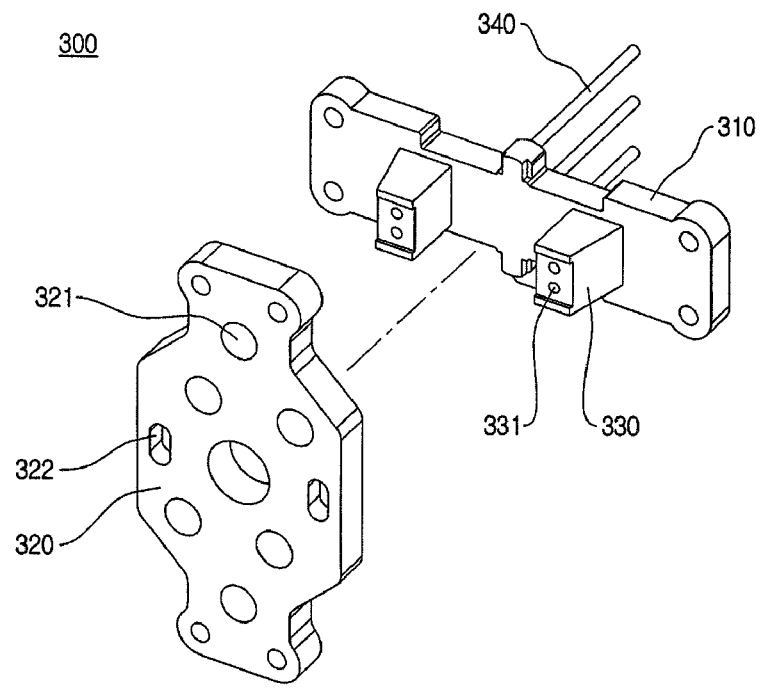
FIG. 5 is an enlarged perspective view showing the ejector in FIG. 3.
Figure 6:
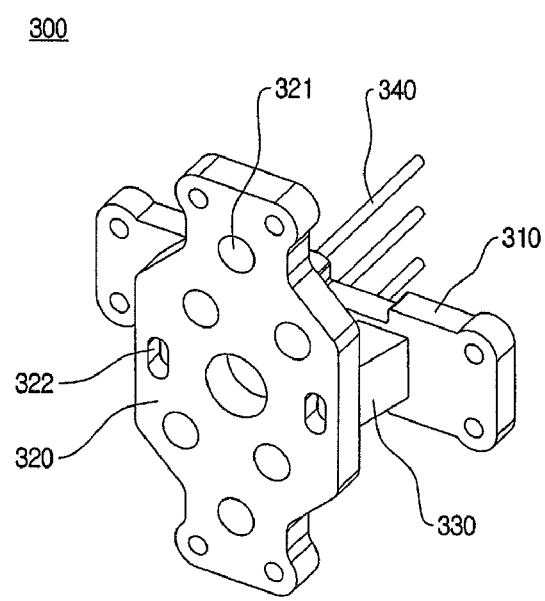
FIG. 6 is a perspective view showing the combined ejector in FIG. 5.

FIG. 5 is an enlarged perspective view showing the ejector in FIG. 3. FIG. 6 is a perspective view showing the combined ejector in FIG. 5.

The first ejector plate 310 is formed in a bar shape extending in one direction, and has a pair of spacers 330 disposed on the upper surface thereof so as to maintain a gap between the first ejector plate 310 and the second ejector plate 320. The upper surface of each spacer 330 is provided with coupling holes 331 which are used for the coupling operation to the second ejector plate 320.

A plurality of ejector pins 340 are installed on the lower surface of the first ejector plate 310.

The second ejector plate 320 is formed so as to extend in a direction intersecting with the first ejector plate 310. The second ejector plate 320 is provided with a plurality of guide holes 321 which allow the guide pins 226 to be inserted thereinto. Slots 322 are respectively formed at the positions corresponding to the coupling holes 331 of the spacers 330. Screws (not shown) are respectively fastened to the coupling holes 331 of the spacer 330 via the slots 322, thereby coupling the first ejector plate 310 to the second ejector plate 320.

The first ejector plate 310 and the second ejector plate 320 are coupled to each other so as to form a cross shape, and the ejector pins 340 may be installed at various positions corresponding to the shape of the ejector.

The ejector 300 according to the embodiment is separated into two parts, but the disclosure is not limited thereto. For example, the ejector 300 may be separated into three or more parts. In addition, in the embodiment, the ejector pins 340 are installed in only the first ejector plate 310, but the disclosure is not limited thereto. For example, the ejector pins 340 may be installed on the lower surface of the second ejector plate 320.

The second ejector plate 320 is connected to a known driving unit (not shown) so as to be movable in a vertical direction. Accordingly, the molded product formed inside the die is extracted in such a manner that the ejector 300 moves along the guide pins 226 in a vertical direction by operating the driving unit.

Figure 7:
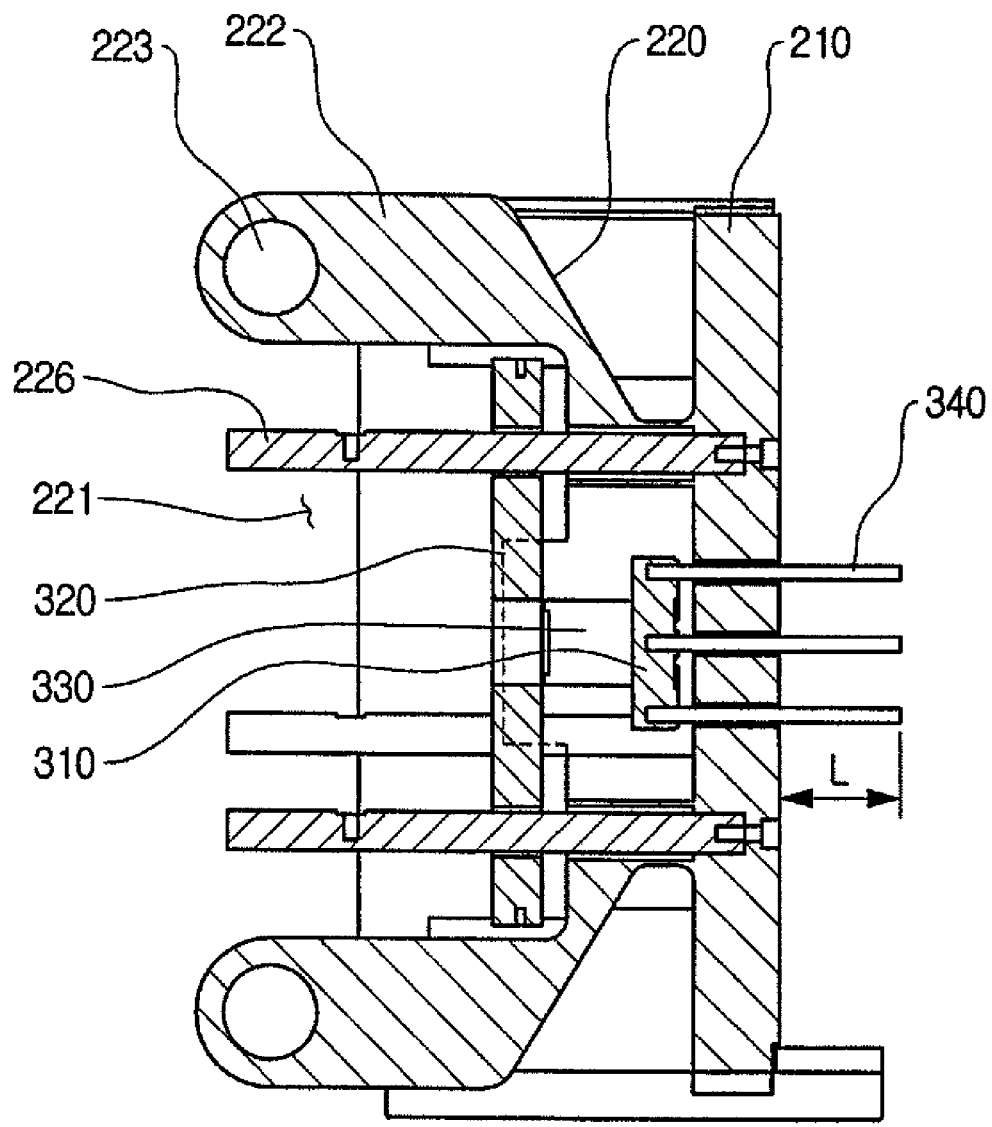
FIG. 7 is a sectional view showing the operated moving plate equipped with the ejector according to the embodiment.

FIG. 7 is a sectional view showing the operated moving plate equipped with the ejector according to the embodiment. As shown in FIG. 7, when the ejector 300 moves down by a distance L along the guide pins 226, the ejector pins 340 protrude from the lower surface of the base plate 210 so as to push outward the molded product formed inside the die.

As described above, since the ejector according to the embodiment is separated into two or more parts, it is advantageous in that the ejector according to the embodiment is more conveniently applied to the moving plates having various structures compared with an ejector with a single part.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An ejector for an injection molding machine used to extract a molded product formed inside a die, the ejector comprising:
   a first ejector plate which is movably installed in a moving plate for fixing the die;
   a second ejector plate which is separably connected to the first ejector plate; and
   an ejector pin which is installed in at least one of the first and second ejector plates so as to push outward the molded product,
   wherein spacers are installed between the first and second ejector plates, the spacers being integrally formed with an upper surface of the first ejector plate so as to have a gap between the spacers, and the second ejector plate being coupled to upper portions of the spacers.

2. The ejector according to claim 1, wherein the first and second ejector plates are formed in a bar shape extending in one direction, and
   wherein the first and second ejector plates are coupled to each other so as to intersect with each other.

3. The ejector according to claim 1, wherein one of the first and second ejector plates is inserted into the guide pin so as to be movable in a vertical direction.

4. A moving plate equipped with an ejector used to extract a molded product formed inside a die, the moving plate comprising:
   a base plate which has the die installed in a lower surface thereof, the base plate having a pin hole formed therein;
   a frame installed above the base plate, the frame having an opening formed at the center thereof;
   a first ejector plate which is located in a space formed between the base plate and the frame and is movably installed therein;
   a second ejector plate which is located inside the opening of the frame and is separably connected to an upper portion of the first ejector plate; and
   an ejector pin which is installed in at least one of the first and second ejector plates so as to pass through the pin hole,
   wherein spacers are installed between the first and second ejector plates, the spacers being integrally formed with an upper surface of the first ejector plate so as to have a gap between the spacers, and the second ejector plate being coupled to upper portions of the spacers.

5. The moving plate according to claim 4, wherein a sectional area of the frame gradually decreases in a direction toward the base plate.

6. The moving plate according to claim 4, wherein the first and second ejector plates are formed in a bar shape extending in one direction, and
   wherein the first and second ejector plates are coupled to each other so as to intersect with each other.

7. The moving plate according to claim 4, wherein a guide pin is installed in the frame and the base plate in a fixed manner, and
   wherein one of the first and second ejector plates is inserted into the guide pin.

* * * * *